United States Patent
Laufer et al.

(10) Patent No.: US 12,222,935 B2
(45) Date of Patent: Feb. 11, 2025

(54) DECISION SUPPORT SYSTEM FOR DATA RETRIEVAL

(71) Applicant: ServiceNow Canada Inc., Montreal (CA)

(72) Inventors: Eric Laufer, Montreal (CA); Francois Maillet, Montreal (CA)

(73) Assignee: ServiceNow Canada Inc., Montreal (CA)

(*) Notice: Subject to any disclaimer, the term of this patent is extended or adjusted under 35 U.S.C. 154(b) by 24 days.

(21) Appl. No.: 17/753,216

(22) PCT Filed: Aug. 26, 2020

(86) PCT No.: PCT/CA2020/051160
§ 371 (c)(1),
(2) Date: Feb. 24, 2022

(87) PCT Pub. No.: WO2021/035347
PCT Pub. Date: Mar. 4, 2021

(65) Prior Publication Data
US 2022/0292087 A1    Sep. 15, 2022

Related U.S. Application Data

(60) Provisional application No. 62/894,267, filed on Aug. 30, 2019.

(51) Int. Cl.
*G06F 16/00* (2019.01)
*G06F 16/242* (2019.01)
(Continued)

(52) U.S. Cl.
CPC ......... *G06F 16/245* (2019.01); *G06F 16/243* (2019.01); *G06F 16/248* (2019.01); *G06F 16/258* (2019.01); *G06F 16/285* (2019.01)

(58) Field of Classification Search
CPC .. G06F 16/3329; G06F 40/40; G06F 16/3344; G06F 40/30; G06F 16/90332;
(Continued)

(56) References Cited

U.S. PATENT DOCUMENTS 11,087,087 B1 * 8/2021 Mayer .................... G06F 40/30
2015/0039292 A1 * 2/2015 Suleman ................ G06F 40/56
704/9

(Continued)

FOREIGN PATENT DOCUMENTS

CA    3033108 A1    2/2018

*Primary Examiner* — Shyue Jiunn Hwa
(74) *Attorney, Agent, or Firm* — Fasken Martineau Dumoulin LLP; Johann Gest; Dennis Haszko

(57) ABSTRACT

Systems for use in data retrieval. A natural language processing module is used in conjunction with a classifier module to analyze and decompose a user query into its elements, and to determine a type of query. These modules are also used to determine the parameters for the query. The type of query and the parameters are then used to find a suitable function that creates a structured database query with the fields in the database query being populated using the parameters and query elements found by the NLP module. The completed structured database query is then used to retrieve relevant data records in response to the query. The retrieved records are then further processed and formatted as necessary to result in a suitable response to the query.

19 Claims, 1 Drawing Sheet

(51) Int. Cl.
  *G06F 16/245* (2019.01)
  *G06F 16/248* (2019.01)
  *G06F 16/25* (2019.01)
  *G06F 16/28* (2019.01)

(58) Field of Classification Search
  CPC ...... G06F 40/20; G06F 16/337; G06F 16/285;
     G06F 40/56; G06F 40/58; G06F 16/2425;
     G06F 16/243; G06F 16/24578; G06F
     16/35; G06F 16/9035; G06F 16/9038;
     G06F 21/552; G06F 18/2431; G06F
     40/211; G06F 40/205; G06F 40/279;
     G06F 40/284; G06F 16/345; G06F
     16/353; G06F 16/355; G06F 18/00; G06F
     18/214; G06F 18/2148; G06F 18/22;
     G06F 21/55; G06F 21/554; G06F 21/577;
     G06F 21/602; G06F 21/6254; G06F
     2218/08; G06F 3/017; G06F 3/04817;
     G06F 40/10; G06F 40/247; G06F 40/258;
     G06F 40/295; G06F 40/35; G06F 40/55;
     G06F 16/245; G06F 16/2471; G06F
     16/334; G06F 16/338; G06F 16/9535;
     G06F 3/16; G06F 3/167; G06F 40/216;
     G06F 40/289; G06N 5/022
  See application file for complete search history.

(56) References Cited

U.S. PATENT DOCUMENTS

| | | | |
|---|---|---|---|
| 2016/0132590 A1* | 5/2016 | Byron | G06F 16/3344 |
| | | | 707/722 |
| 2017/0083569 A1 | 3/2017 | Boguraev | |
| 2018/0075131 A1 | 3/2018 | Van Hoof | |
| 2018/0336198 A1 | 11/2018 | Zhong | |
| 2019/0073598 A1* | 3/2019 | Giovannini | G06N 5/043 |
| 2019/0147083 A1 | 5/2019 | Milligan | |

* cited by examiner

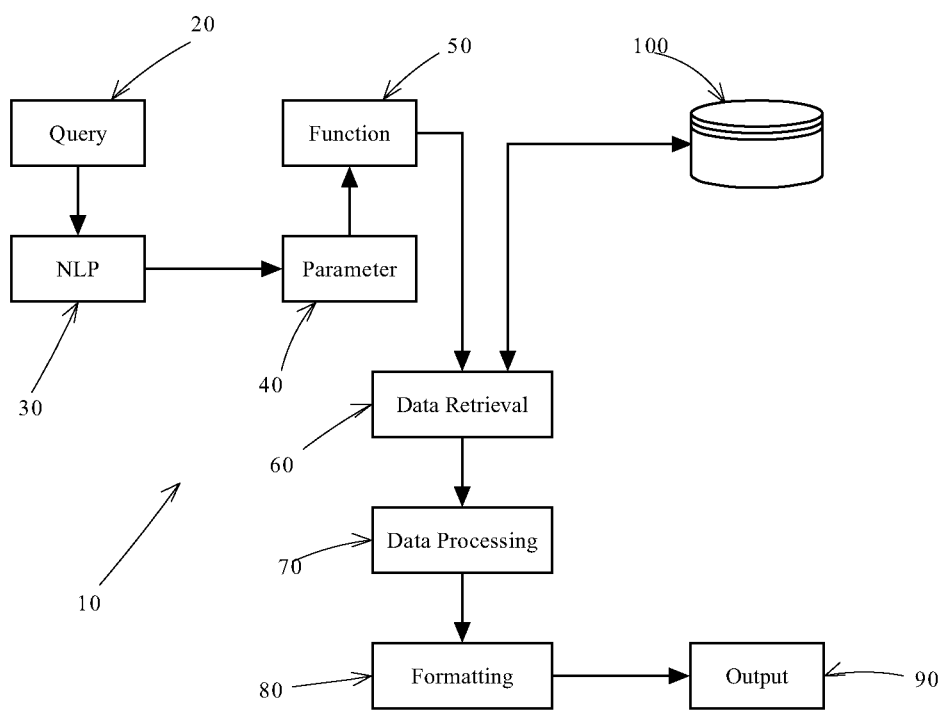

DECISION SUPPORT SYSTEM FOR DATA RETRIEVAL

TECHNICAL FIELD

The present invention relates to data processing. More specifically, the present invention relates to systems and methods relating to data retrieval as a response to a user query.

BACKGROUND

The information revolution of the past few decades has led to an explosion in the amount of data both generated and gathered. Companies now have massive databases that can be data mined to assist them in setting strategic and tactical goals, planning for the future, and in determining their fiscal and administrative health. However, data mining has a fairly significant problem hiding within the concept. To properly do data mining, especially using databases, one must first formulate a suitable query.

As would be known to those of skill in the art, formulating a suitable query for a database may not be as straightforward as it first seems. The query has to be properly formulated otherwise the results provided may not answer what the user really wants to know. Syntax will need to be properly formulated, the variables and field names in the database have to be known, etc.

Such a query would be more helpful if users could use regular language to mine data from databases. This would allow databases to be more useful and would allow companies to properly leverage the data that they generate.

Based on the above, there is therefore a need for systems and methods that allow for more useful queries to databases. Preferably, such queries would be addressed by databases and knowledge systems that can be quickly and more easily used such that tactical and/or strategic corporate questions can be more easily responded to.

SUMMARY

The present invention provides systems for use in data retrieval. A natural language processing module is used in conjunction with a classifier module to analyze and decompose a user query into its elements, and determine a type of query. These modules are also used to determine the parameters for the query. The type of query and the parameters are then used to find a suitable function that creates a structured database query with the fields in the database query being populated using the parameters and query elements found by the NLP module. The completed structured database query is then used to retrieve relevant data records in response to the query. The retrieved records are then further processed and formatted as necessary to result in a suitable response to the query.

In a first aspect, the present invention provides a system for retrieving data, the system comprising:
  a query reception module for receiving a query from a user;
  a natural language processing (NLP) module for receiving an output of said query reception module and for processing said query into query elements;
  a parameter/classifier module for receiving said query elements from said NLP module and for determining a query type and parameters for said query based on said query elements;
  a function module for receiving an output from said parameter/classifier module and for selecting a suitable function for said query based on said query type and on said parameters for said query;
  a data retrieval module for retrieving data from a set of data based on a result from said function module and on said parameters;
  a data processing module for processing data retrieved from said set of data to thereby determine a response to said query;
  a data formatting module for receiving an output of said data processing module and for formatting said output such that said output responds to said query from said user.

In a second aspect, the present invention provides a system for retrieving data, the system comprising:
  a natural language processing module for processing a user query into query elements;
  a parameter/classifier module for receiving said query elements from said NLP module and for determining parameters for said query based on said query elements;
  a function module for selecting a suitable function for said query based on said parameters for said query;
  a data retrieval module for retrieving data based on an output of said function module;
  a data processing module for processing retrieved data to thereby determine a response to said query.

BRIEF DESCRIPTION OF THE DRAWINGS

The embodiments of the present invention will now be described by reference to the following figures, in which identical reference numerals in different figures indicate identical elements and in which:
  FIG. 1 is a block diagram of a system according to one aspect of the present invention.

DETAILED DESCRIPTION

In one aspect, the present invention addresses the issues noted above by providing a system that uses a natural language processing (NLP) module to allow users to use natural language to enter queries. Thus, users can type or speak their queries in a natural way without the need to code or formulate their queries. The NLP module analyzes the queries and decomposes the queries into their constituent parts. These constituent parts or query elements are then analyzed to determine whether the user's query is one of a specific number of types of queries. The entities within the query are determined and the function/desired relationship/intent between the entities is also determined. Candidates for each entity are then determined based on a knowledge graph (i.e., a database). Based on the context given by the function or desired relationship or intent in the query, the candidates for each entity can be pruned or narrowed. The resulting candidates and the function or desired relationship or intent can then be used to "compile" or formulate a structured database query or search on the knowledge graph or database. This search can be performed using a data retrieval module that searches and retrieves data from the database. The results from the database are then processed to ensure that the user's query is responded to. The result is then formatted and then presented to the user.

It should be clear that, once the NLP module has separated the constituent parts of the query, these various portions or elements of the query are used by a classifier module to categorize the query. As should be clear, this classifier module may include one or more submodules that use one or more machine learning methods or techniques. As an example of the classifier analysis, the user may query "How many Ph.Ds are employed by our company?" This query would then be decomposed, using the NLP module, into its elements including the query elements "how many", "Ph.Ds", "employed", "our company". Similarly, a query of "Who is in charge of our accounting department?" would be decomposed into the query elements "who is", "in charge", "our", "accounting department". As well, a question of "When is Mr. Tanaka's birthday?" would be decomposed into "when is", "Mr. Tanaka", and "birthday". Finally, a query of "Which of our accountants live in Toronto?" would be decomposed into "which", "our accountants", "live", and "Toronto".

Once the system of the present invention has decomposed the query, the decomposed elements are then analyzed by the classifier module to determine the type of query being asked or, in another sense, to determine the user's desired intent or desired relationship between the elements. A query can be a number/counting query (e.g., a "how many" query or a "what's the number of" query) or an identification query (e.g., a "who is" query or a "what is" query). Other query types may, of course, be possible. Once the type of query has been determined, a suitable structured database query or search can then be created based on the other elements of the query and using one or more specific functions. As an example, a "when is" query would be a date identification query, and this would cause the system to consider date identification functions. Similarly, a "how many" query would mean a counting query and, if the rest of the query identifies a category of people to be counted, the system would thus consider a personnel counting function. A "which" query would mean an identification query out of a specific group, i.e., identifying which members of a group satisfy one or more of the criteria provided by the rest of the query. As such, the system would select an identification function that would allow for the identification of a group and for the entry of one or more criteria to be adhered to. Of course, the classifier module can be configured to use a machine learning model that has been trained in classifying queries based on the type of the query being sought.

It should be clear that each function that is used to create or formulate a structured database query may be configured to assemble or "compile" each query based on the elements from the original. Depending on the implementation of the function, the function may be as simple as a hard coded template that simply populates the various fields in the template with the data from the original query or the function may be a more complex implementation that creates each structured database query from scratch using predefined rules that are specific to the type of query being made. As an example, a complex data range query combined with an identification query would need not just the variables and parameters for the date range but also the parameters for the identification query. The data range and identification query parameters would then be combined to the desired query language by the compiler.

As one example, the query that asked for a Mr. Tanaka's birthdate would result in a date identification query that creates a structured database search for employee records with a surname of "Tanaka" (by using an identification element in the database search). The results can then be further processed by retrieving the employee date of birth.

While the above discussion notes selecting a single function for each query, more complex queries may necessitate using multiple functions. A compound query may involve two or more functions, especially if the query can be considered to be two or more queries combined into a single query. Other queries may be decomposed into two or more simpler queries and then performing each of the simpler queries separately. The results of each of the simpler queries can then be combined or processed together to result in a response to the user's single, compound query. As can be imagined, multiple functions are possible. These functions for query types may include a list query type (i.e., listing data that conforms to the query parameters), count query type (i.e., counting data points that conform to the query parameters), grouping query type (i.e., determining one or more groupings of data points that conform to the query parameters), and time query type (i.e., determining data points that conform to one or more specific time related query parameters). Other functions may, of course, be possible.

Regarding the further processing, this processing may take many forms once the relevant data has been retrieved from the database. In one example, retrieved records may be counted to determine how many retrieved records conform to the search/filter parameters. In the above examples, the "how many" queries would require that the retrieved records be counted. For the identification queries, the retrieved records may be double checked to ensure that the records conform to the criteria in the user's query. Other types of queries may also require further processing, including checking against the identified query elements, adding, subtracting, or otherwise performing mathematical operations on the data retrieved, counting the records retrieved, and otherwise manipulating the data records retrieved.

After the further processing, the result of the processing can be formatted such that it can be presented to the user. This formatting may take the form of collating the retrieved records into a table or a list to be presented to the user or a graph may be produced from the retrieved records. As an example, the user may query the system to show a year on year growth of profit for the company in graph form. The system can thus retrieve the company's yearly reports and extract the profit for each year using a suitably selected template. The retrieved records would then be processed to extract the profit for each year and the formatting may take the form of plotting these retrieved profit figures into a graph.

Referring to FIG. 1, a block diagram according to one aspect of the present invention is presented. The system 10 includes an input module 20, an NLP module 30, a parameter/classifier module 40, and a function module 50. Also included in the system 10 are a data retrieval module 60, a data processing module 70, and a formatting module 80. The result of the system 10 is an output 90. A database 100 provides the repository from which data is retrieved by the system.

In operation, the system 10 receives a user's query by way of the input module 20. The user's query may be typed into a data processing device or a voice interface may be used. The input module 20 converts, if necessary, the query into a format that is acceptable and understandable to the system. The query is then passed on to the NLP module 30 and this module analyzes the query to determine its constituent parts or elements. This ensures that the type of query can be determined and that the elements of the query are also parsed from the query. The results of the NLP module are then passed to the parameter/classifier module 40. The parameter/classifier module 40 then determines the parameters of the query and determines the type of query being sought. This means that, in accordance with the type of query being made, the identifying elements in the query are determined. Thus, if the query is an identification query (e.g., a "who is" or a "what is" query), then the elements or parameters for the query are separated and extracted from the query. Thus, identifying characteristics for the query (e.g., determining that the records to be retrieved are employee records, determining that a record has to conform to a specific city identification, etc.) are determined, identified, and segregated from the rest of the query. These identifying parameters (or other parameters relevant to the query) are then sent, along with the query type and the rest of the query, to the function module 50. The function module 50 then uses the parameters and the query type to determine which function is suitable for the query. Thus, as an example, given an identification query (e.g., "who are the accountants currently in the company"), one or more identification functions may be used. The suitable function is selected and executed to create a relevant structured database query. The fields in the database query are then populated by relevant query elements (e.g., in the query, the term "accountant" would be used to populate a "job title" field in the structured database query). It should be clear that the parameters/classifier module may include a submodule that applies machine learning techniques to determine the proper function to be selected.

Once the structured database query has been formulated, the data is retrieved using the now populated database query by way of the data retrieval module 60. This data may be retrieved directly from the database 100.

After the relevant data points have been selected and retrieved, the retrieved data can then be processed further by way of the data processing module 70. As noted above, this further processing may be as simple as ordering or reordering the retrieved records or data points. As well, the further processing may involve manipulating the data contained in the records or performing logical or mathematical operations on one or more of the retrieved records or on the data contained in one or more of those retrieved records.

After the data has been processed, then the results can be formatted for presentation to the user by way of the formatting module 80. The formatting module 80 ensures that the data is suitable for presentation to the user and that the data is inline with the user's original query. Once formatted, the result can then be provided to the user as output 90.

The various aspects of the present invention may be used for any number of industries and any number of applications. In some implementations, the database may be part of an inventory management system or the database may contain personnel records. As such, the system may be configured, based on the functions, to answer queries regarding inventory levels, personnel records, and product details. Of course, any suitable database, preferably a relational database, may be used. The system may be used with any implementation of a knowledge graph such as, of course, relational databases.

It should be clear that the various aspects of the present invention may be implemented as software modules in an overall software system. As such, the present invention may thus take the form of computer executable instructions that, when executed, implements various software modules with predefined functions.

The embodiments of the invention may be executed by a computer processor or similar device programmed in the manner of method steps or may be executed by an electronic system which is provided with means for executing these steps. Similarly, an electronic memory means such as computer diskettes, CD-ROMs, Random Access Memory (RAM), Read Only Memory (ROM) or similar computer software storage media known in the art, may be programmed to execute such method steps. As well, electronic signals representing these method steps may also be transmitted via a communication network.

Embodiments of the invention may be implemented in any conventional computer programming language. For example, preferred embodiments may be implemented in a procedural programming language (e.g., "C" or "Go") or an object-oriented language (e.g., "C++", "java", "PHP", "PYTHON" or "C#"). Alternative embodiments of the invention may be implemented as pre-programmed hardware elements, other related components, or as a combination of hardware and software components.

Embodiments can be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink-wrapped software), preloaded with a computer system (e.g., on system ROM or fixed disk), or distributed from a server over a network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

A person understanding this invention may now conceive of alternative structures and embodiments or variations of the above all of which are intended to fall within the scope of the invention as defined in the claims that follow.

What is claimed is:

1. A system for retrieving data, the system comprising:
 a non-transitory storage medium storing computer-readable instructions thereon; and
 at least one processor operatively connected to the non-transitory storage medium, the at least one processor, upon executing the computer-readable instructions, being configured for:
 receiving a natural language query from a user;
 decomposing said natural language query into query elements using at least one natural language processing (NLP) model;
 determining, using at least one classifier, query types and respective query parameters for said query based on said query elements and relationships between query elements for said query;

selecting at least one suitable function for said query from a set of functions based on said query types, said respective query parameters and the relationships between the query elements to formulate at least one database query;

retrieving data from at least one knowledge graph database operatively connected to the system, using said at least one database query;

processing said data retrieved from the at least one knowledge graph database based on the relationships between the query elements to thereby determine a response to said query; and formatting said response into a formatted response to said natural language query from said user.

2. The system according to claim 1, wherein said at least one NLP model comprises a NLP machine learning model.

3. The system according to claim 1, wherein said at least one classifier comprises at least one trained classification machine learning model.

4. The system according to claim 1, wherein said query types comprises at least two of: an identification query, an amount query, a strategy query, a counting query, a listing query, a grouping query, a time query, and a calculation query.

5. The system according to claim 4, wherein each query type corresponds to at least one function.

6. The system according to claim 1, wherein said at least one classifier is configured to classify said query based on said query types.

7. The system according to claim 1, wherein the at least one classifier comprises a trained classification machine learning model.

8. The system according to claim 7, wherein said at least one classifier is configured to determine at least one of: entities within the query, relationships between the entities and intent between the entities to be used as candidates by the suitable function to retrieve data from the at least one knowledge graph database.

9. A system for retrieving data, the system comprising:
a non-transitory storage medium storing computer-readable instructions thereon; and
at least one processor operatively connected to the non-transitory storage medium, the at least one processor, upon executing the computer-readable instructions, being configured for:
decomposing, using at least one natural language processing (NLP) model, a user query into query elements;
determining, using at least one classifier, parameters for said query based on said query elements and relationships between query elements for said query;
selecting at least one suitable function from a set of functions for said query based on said parameters for said query and the relationships between the query elements to formulate at least one database query;
retrieving data from at least one knowledge graph database operatively connected to the system using said at least one database query; and
processing retrieved data based on the relationships between the query elements to thereby determine a response to said query.

10. The system according to claim 9, further comprising, prior to said retrieving the data from the at least one knowledge graph database: generating, using the at least one suitable function a structured database query based on said parameters.

11. The system according to claim 9, further comprising:
determining, using the at least one classifier, respective query types based on said query elements; and wherein said generating the structured database query is based on the query types.

12. The system according to claim 9, wherein the at least one suitable function comprises a plurality of suitable functions each of a respective query type.

13. The system according to claim 9, wherein said processing comprises at least one of: ordering said data, performing a logical operation on said data, performing a mathematical operation on said data.

14. The system according to claim 9, wherein formatting said response into a formatted response to said natural language query from said user comprises at least one of: generating a graph based on the response, generating a list based on the response, and generating a table based on the response.

15. The system according to claim 9, wherein the at least one classifier comprises a trained classification machine learning model.

16. The system according to claim 15, wherein said at least one classifier is configured to determine at least one of: entities within the query, relationships between the entities and intent between the entities to be used as candidates by the suitable function to retrieve data from the at least one knowledge graph database.

17. A method for retrieving data, the method being executed by at least one processor, the method comprising:
receiving a natural language query from a user;
decomposing said natural language query into query elements using at least one natural language processing (NLP) model;
determining, using at least one classifier, query types and respective query parameters for said query based on said query elements and relationships between query elements for said query;
selecting at least one suitable function for said query from a set of functions based on said query types, said respective query parameters and the relationships between the query elements to formulate at least one database query;
retrieving data from at least one knowledge graph database operatively connected to the at least one processor, using said at least one database query;
processing said data retrieved from the at least one knowledge graph database based on the relationships between the query elements to thereby determine a response to said query; and
formatting said response into a formatted response to said natural language query from said user.

18. The method according to claim 17, wherein the at least one NLP comprises a trained NLP machine learning model and the at least one classifier comprises a trained classification machine learning model.

19. The method according to claim 18, wherein said query types comprises at least two of: an identification query, an amount query, a strategy query, a counting query, a listing query, a grouping query, a time query, and a calculation query.

\* \* \* \* \*